United States Patent [19]

Mitchell

[11] 4,010,651
[45] Mar. 8, 1977

[54] TWO-STAGE WHEEL BALANCER

[75] Inventor: Wallace F. Mitchell, Mettawa, Ill.

[73] Assignee: Ammco Tools, Inc., North Chicago, Ill.

[22] Filed: July 28, 1975

[21] Appl. No.: 599,826

[52] U.S. Cl. ............................................. 73/483
[51] Int. Cl.² ................................... G01M 1/12
[58] Field of Search .................... 73/483, 484, 485

[56] References Cited

UNITED STATES PATENTS

| | | | |
|---|---|---|---|
| 2,909,063 | 10/1959 | Bageman | 73/484 |
| 3,280,640 | 10/1966 | Fuertges | 73/484 |
| 3,352,161 | 11/1967 | Marshall | 73/484 |
| 3,888,128 | 6/1975 | Mitchell | 73/484 |

*Primary Examiner*—James J. Gill
*Attorney, Agent, or Firm*—Edmond T. Patnaude

[57] ABSTRACT

A portable bubble balancer incorporates a wheel support and pivot assembly which is spring biased in an upward direction into an interlocked position with the base of the balancer to prevent pivoting of the wheel support in the absence of a wheel thereon.

6 Claims, 3 Drawing Figures

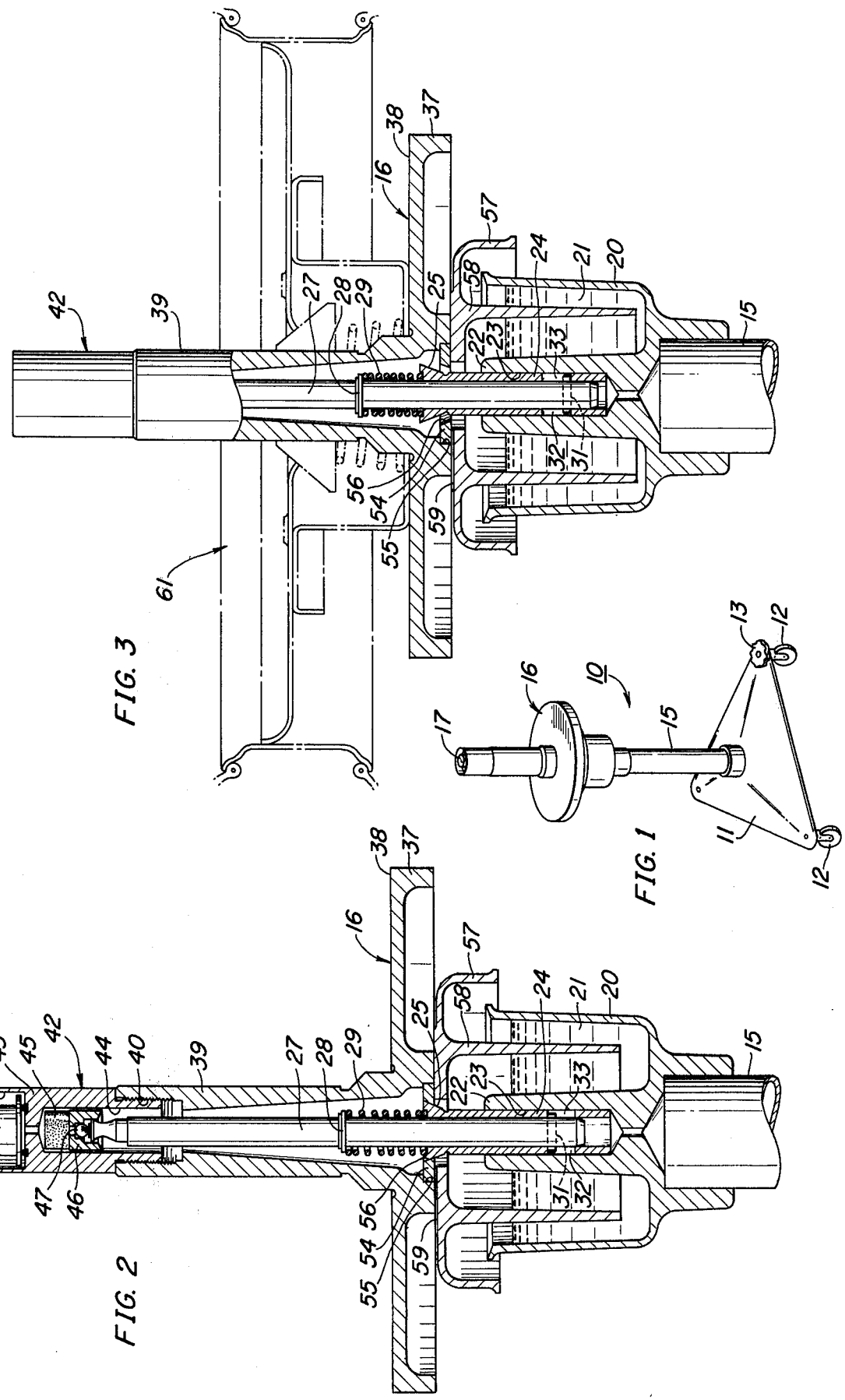

TWO-STAGE WHEEL BALANCER

The present invention relates in general to the art of balancing rotors and it relates more particularly to a new and improved bubble balancer of the type used to determine the static balance of the wheels of automotive vehicles.

BACKGROUND OF THE INVENTION

Bubble balancers are widely used in automotive repair shops and garages and basically include a base supported on casters for movement of the unit from one place to another and having an upright rigid post to the top of which a wheel support is pivoted mounted on a universal type pivot such, for example, as a ball and platen. A 360° spirit level is mounted on the wheel support to indicate when the wheel and thus the wheel support lies in a horizontal plane. In use, a wheel to be balanced is placed on the wheel support and the bubble in the spirit level is observed to indicate the direction in which the wheel is inclined from the horizontal plane. Weights are then added at the appropriate places along the rim of the wheel until the wheel lies in a perfectly horizontal plane as indicated by the fact that the bubble in the level is centrally disposed therein. In order to speed up this operation it is the usual practice to incorporate some form of damping means in the balancer and a common type is an open liquid reservoir mounted to the base and containing a viscous liquid such as, for example, oil. A baffle depends from the pivotally mounted wheel support into the viscous liquid thereby causing the rotor and the support on which it is mounted to quickly reach the equilibrium rest position.

Bubble balancers of this type are subjected to rough handling and in order to prevent damage to the sensitive pivot assembly various means have been employed including a lever operated linkage for holding the wheel support off the pivot assembly except when a wheel is to be balanced. Another means for protecting the sensitive pivot assembly is to incorporate resilient means in the pivot assembly to absorb any sudden shocks which might otherwise be transmitted to the pivot assembly when a heavy wheel is dropped on the balancer. This latter means has proven to be extremely successful, but since the wheel support is always mounted by the pivot assembly it is free to rock back and forth when the wheel balancer is moved from place to place. This can cause the oil in the damping reservoir to splash out on the floor. Various types of baffles have been employed to prevent this from occurring but they have not been entirely satisfactory. Nevertheless, there are advantages to a wheel balancer system in which the wheel support is at all times supported by the pivot assembly.

SUMMARY OF THE INVENTION

Briefly, in accordance with the present invention a wheel support is mounted on a spindle by a ball and platen pivot assembly. The spindle and thus the wheel support which is pivotally mounted thereon are spring biased in an upward direction to cause interlocking means respectively provided on the spindle and on the wheel support to be interengaged or interlocked to prevent any pivotal movement of the wheel support relative to the spindle. This interlocking arrangement, moreover, positions the wheel support in a plane perpendicular to the longitudinal axis of the spindle thereby enabling the user to adjust the base of the balancer to position the spindle in a truly vertical direction while observing the spirit level on the wheel support. The force of the spring used to bias the wheel support into an upward interlocked position is less than the combined weight of the wheel support and the wheel to be balanced thereon whereby when a wheel is placed on the wheel support the force of the spring is overcome and the interlocking means on the wheel support moves out of engagement with the interlocking means on the base thereby permitting the wheel support to pivot in a universal manner on the pivot assembly. When the wheel is not on the wheel support, however, the interlocking means prevents the wheel support from swinging back and forth as the wheel balancer is moved from place to place and thus eliminates any excessive splashing of the oil in the reservoir.

BRIEF DESCRIPTION OF THE DRAWINGS

Further objects and a better understanding of the present invention may be had by reference to the following detailed description, wherein:

FIG. 1 is a perspective view of a bubble balancer embodying the present invention;

FIG. 2 is a vertical section, greatly enlarged, of the upper portion of the wheel balancer of FIG. 1; and FIG. 3 is a view similar to that of FIG. 2 but showing a wheel in place on the wheel support of the balancer.

DETAILED DESCRIPTION OF THE INVENTION

Referring particularly to FIG. 1, a bubble balancer 10 comprises a generally triangular base 11 supported on three casters 12 with the height of one of the casters being adjustable by means of a hand knob 13. A central post 15 is suitably mounted to the base 11 and a wheel support 16 is pivotally mounted thereon. A spirit level 17 is centrally provided at the top of the wheel support 16 to indicate the orientation of the supporting surface of the wheel support 16 relative to the true horizontal plane.

Referring to FIG. 2 a cup-shaped reservoir member 20 is rigidly mounted on the top of the post 15 and contains a viscous liquid 21 such as for example, oil. The reservoir member 20 includes an upstanding central post 22 provided with a central bore 23 which tightly receives a locking tube 24. The tube 24 has a divergent, frustoconical upper external surface portion 25. An elongated rod-like pedestal 27 is slidably disposed in the tube 24 and has an annular shoulder in the form of a split ring 28 fixed thereon. A coil spring 29 is compressed between the ring 28 and the upper end of the tube 24 to spring bias the pedestal 27 toward an upper position. The upper position of the pedestal 27 is limited by a pin 31 which extends in a transverse direction through the pedestal 27 with its two end portions received in a pair of diametrically opposite longitudinal slots 32 and 33 in the tube 24. The wheel support 16 is an integral member, such as a metal casting, having a horizontal platen 37 having a planar upper surface 38 lying perpendicular to the central longitudinal axis of an upright tubular post setion 39 provided with an internally disposed counterbore 40 at its upper end for threadably receiving a pivot head assembly 42. The pivot head assembly 42 includes a body member 43 having a downwardly opening cylindrical bore 44 housing an elastomeric cylinder 45 at the top and a pivot ball mounting sleeve 46 in which a pivot ball 47 is fixedly mounted so as to rest and be supported on the upper surface of the spindle 27. The spirit level 17 is mounted in a cylindrical recess 50 at the top of the body member 43 so as to be observable from the top but also to be somewhat protected.

A locking ring 54 is fixedly mounted in an internal annular groove 55 in the platen member 37 and has a frustoconical inner surface 56 which diverges in an upper direction and mates with the frustoconical surface 25 on the tubular member 24 when the wheel support 36 is in the illustrated interlocked position. A dampling cup member 57 is secured by machine screws to the bottom of the wheel support 16 and has an annular flange 58 which depends into the oil bath 21. A groove 59 in the upper surface of the member 57 provides an air vent to the interior of the damping member.

Referring to FIG. 3, when a wheel 61 to be balanced rests on the wheel support 16 the spring 29 is compressed by the combined weight of the wheel 61 and the wheel support member 16 to move the ring 54 downwardly out of engagement with the conical surface 25 of the tube 24. Accordingly, the wheel support 36 is free to pivot on the pivot assembly, and the wheel 61 may be balanced in the normal manner.

When the wheel 61 is removed from the wheel support 36 the spring 29 expands to lift the pedestal 27 and the wheel support 36 which is continuously supported thereon into locked position shown in FIG. 2 wherein the frustoconical surfaces 25 and 26 are interlocked. Inasmuch as the surfaces 25 and 26 are frustoconical and axially disposed relative to the pedestal 27 and to the planar surface 38 the plane of the spirit level 29 is perpendicular to the vertical axis of the spindle 27 when the wheel support is in the interlocked condition. Therefore, when the balancer is moved, the knob 13 may be used to adjust the position of the axis of the spindle 27 to a truly vertical direction. In this regard it should be realized that the degree of swing of the wheel support on the spindle is relatively limited wherefore it is important that the spindle 27 be in a relative vertical position during the wheel balancing operation for otherwise an unbalanced wheel may cause the wheel support to tilt to a limited position whereby the operator cannot be sure as to the amount of weight required to balance the wheel.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for balancing a rotor, comprising
a base,
a rotor support having an annular planar rotor support surface and an upstanding central tubular section,
means for indicating the angular position of said rotor support surface relative to the horizontal plane,
a rigid tubular member extending upwardly from said base into said tubular section of said rotor support,
a rod mounted in said tubular member for coaxial sliding movement therein,
means for pivotalably supporting said rotor support on the upper end of said rod,
a downwardly facing frusto-conical external annular shoulder on said tubular member,
an upwardly facing complimentary frusto-conical internal annular surface disposed on said rotor support below said annular shoulder and surrounding said tubular member, and
spring means compressed between said rod and said tubular member for urging said annular surface into facial engagement with said annular shoulder to lock said rotor support to said base with said planar rotor support surface lying perpendicular to the longitudinal axis of said rod.

2. Apparatus according to claim 1 comprising
a convex pivot member carried by said rotor support and resting on the upper end of said rod.

3. Apparatus according to claim 1 comprising
an external flange provided on said tubular member at the upper end thereof,
said annular shoulder being provided on said flange, and
a locking ring mounted to said rotor support at the bottom of said tubular section,
said annular surface being provided on said locking ring.

4. Apparatus according to claim 3 comprising
an external protuberance on said rod, and
said spring means being compressed between the upper end of said tubular member and said protuberance.

5. Apparatus according to claim 1 comprising
a liquid reservoir carried by said base, and
damping means depending from said rotor support into said reservoir.

6. Apparatus according to claim 5 comprising
roller means supporting said base to facilitate the movement of said base on a supporting surface.

* * * * *